June 17, 1969 N. K. MOLLER 3,450,438
VALVE FOR POWDERED AND GRANULAR MATERIAL
Filed Nov. 1, 1966 Sheet 1 of 2

INVENTOR
NIELS KANN MOLLER
BY
ATTORNEYS

June 17, 1969  N. K. MOLLER  3,450,438
VALVE FOR POWDERED AND GRANULAR MATERIAL
Filed Nov. 1, 1966  Sheet 2 of 2

INVENTOR
NIELS KANN MOLLER
BY
ATTORNEYS

United States Patent Office 3,450,438
Patented June 17, 1969

3,450,438
VALVE FOR POWDERED AND GRANULAR MATERIAL
Niels Kann Moller, Valby-Copenhagen, Denmark, assignor to F. L. Smidth & Co., New York, N.Y., a corporation of Delaware
Filed Nov. 1, 1966, Ser. No. 591,328
Claims priority, application Great Britain, Nov. 4, 1965, 46,785/65
Int. Cl. B65g 53/24, 53/46, 53/42
U.S. Cl. 302—21                            1 Claim

ABSTRACT OF THE DISCLOSURE

This invention relates to an improved valve for impeding and regulating flow of powdered and granular material through a duct while maintaining a gas seal with accumulated material in the valve so that a differential gas pressure can be maintained across the valve even during passage of excess material from the valve.

---

It is desirable in the handling of material in powder or granular form or any pulverized type material to provide a valve to regulate the flow of material in a steady stream; such valves are particularly advantageous in regulating material being gravity fed through a ducting system.

One example of the application of such valves is in ducts leading from a hopper containing pulverulent material under atmospheric pressure to a pneumatic conveyor to which the material is supplied through the duct and along which the material is carried under super-atmospheric pressure.

A more important application of such valves is in apparatus for preheating powdered or granular solid material fed to a kiln, such as a rotary cement kiln, by means of the hot effluent gases from the kiln. In one kind of such preheating apparatus hereinafter referred to as the kind described, the waste gases from the kiln are drawn through one or more separators, such as cyclone separators, in series by means of a suction device, such as a fan. In a single stage device the solid material to be preheated is fed into the inlet riser pipe of the separator and is carried in the pipe as a suspension by the hot waste gases from the kiln in intimate heat exchange relationship with the gas. The gas and solid material is subsequently segregated in the separator, the gas being discharged and the solid material passing through a solids outlet pipe from the separator into the upper end of the kiln. In a multistage apparatus, the solid material is fed into the inlet riser pipe of the last separator in the series and is carried as a suspension by the waste gases into the pipe in intimate heat exchange relationship with the gas and the gas and solids are subsequently segregated in the separator as before. The gas is discharged through a gas outlet from the separator and the solid material passes down through a solids outlet from the separator into the inlet pipe of the preceding separator in the series. The solid material is again carried as a suspension by the waste gases into this preceding separator where segregation again occurs. This cycle is repeated so that the solid material passes through all the separators in the series in the reverse direction to that in which the waste gases pass through the separators and the preheated solid material is discharged from the solids outlet of the first separator in the series into the kiln. In order to maintain a monotonic variation in the subatmospheric pressure in the gas system through the separator or series of separators from the kiln to the fan or other suction device, so that the waste gases will be steadily drawn out of the kiln, each pipe through which the solid material passes into the separator inlet riser pipes or into the kiln, is provided with one of the valves in the form of a baffle or other arrangement, which causes the solid material to dam up in the pipe and form an effective gas seal whilst allowing excess material to pass through the pipe substantially in a steady stream.

Broadly stated, the present invention relates to a valve for impeding and regulating flow of powdered and granular material through a duct and is comprised of a hollow funnel-shaped valve member having its wide inlet end facing upstream and its narrow outlet end positioned downstream. The valve member is divided into at least two sections which are pivotally mounted adjacent their inlet ends for movement from a closed position in which the outlet end is closed to an open position in which the outlet end portions of the sections are substantially spaced apart. Means are provided on each of said sections for urging the sections toward each other in its closed position with a dam of material maintained therein sufficient to effect a gas seal across the duct but permitting the sections to pivot to the open position under a weight of material in excess of that required for the gas seal to allow a stream of material to pass through the valve while maintaining the gas seal. Preferably, the member is mounted with its axis of symmetry extending in the direction of flow of the material and the member is divided by at least one axial plane into similar sections.

In certain circumstances it may be advantageous to make the valve member in the form of a truncated cone or pyramid. This is because the vertex of the cone or pyramid will be subjected to heavy wear by the flow of material through it. For the same reason the sections may be shaped so that even when they are fully closed together, there is a small outlet for the material at the narrower downstream end of the valve member.

Furthermore, axially extending slots may be formed between the adjacent edges of the sections of the valve members so that even when the sections are in their closed position some material can escape between the adjacent edges of the sections.

The valve may be fitted at the downstream end of the pipe, forming the duct through which the material passes, particularly when the pipe is one which leads the material into the inlet riser pipe of a separator of a preheating apparatus of the kind described. Preferably, however, the valve is fitted in an interruption in a pipe and is mounted in a housing having an upper portion connected to the bottom portion of the inlet pipe and a lower portion detachably connected to said upper portion and sealing mounted for telescopic movement on an upper portion of the outlet pipe. With this arrangement the housing gives the sections of the valve member room to swing towards and away from one another but provides a sealed connection between the two parts of the interrupted pipe. By detaching the housing from the upper inlet pipe and sliding it downwards relatively to the lower outlet pipe, access can be provided to the moving parts of the valve for the inspection or repairs.

The sections of the valve member may be urged towards one another by means of springs or other conventional loading, but preferably individual weights are used.

One example of a two stage cyclone preheating apparatus for cement raw meal incorporating a number of valves in accordance with the invention is illustrated in the accompanying drawings, in which.

Figure 1:
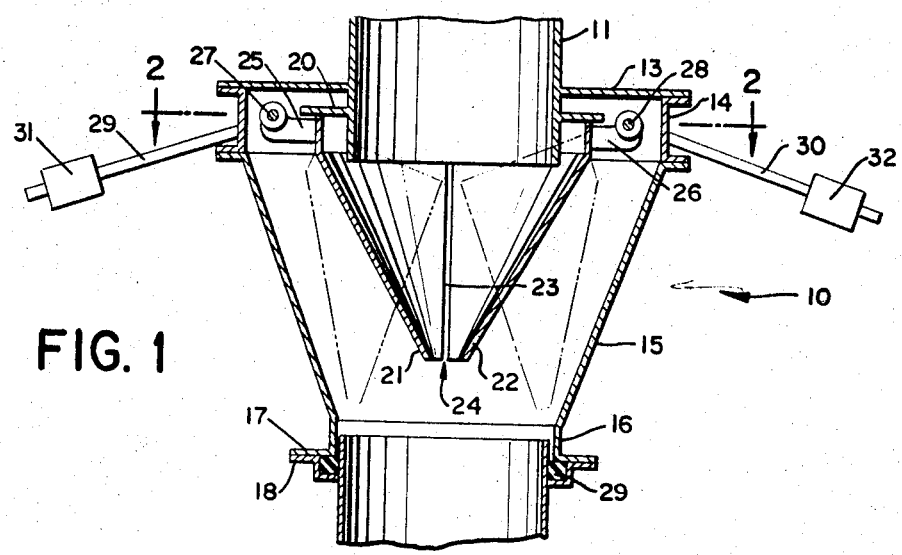
FIG. 1 is a vertical axial section through one of three similar valves of the apparatus.
Figure 2:
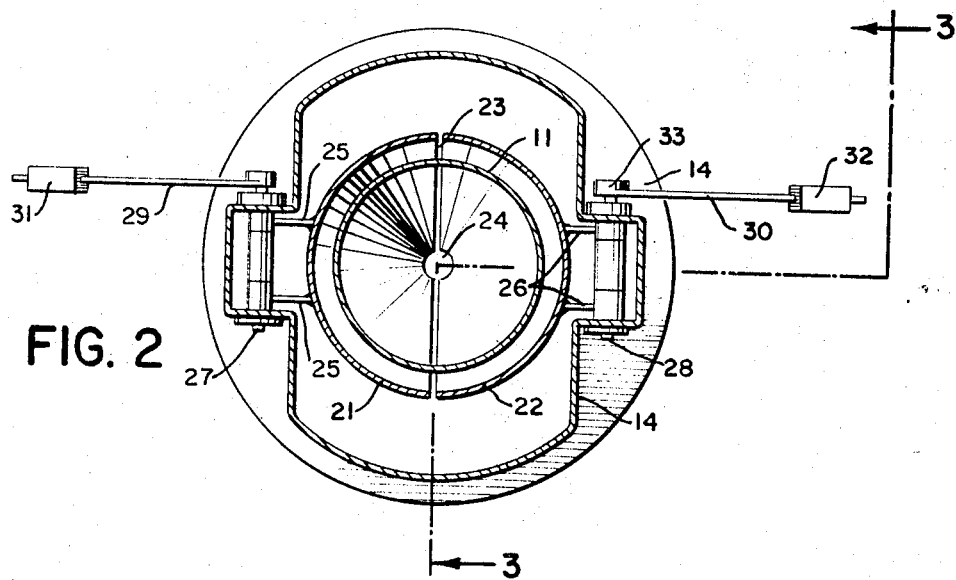
FIG. 2 is a horizontal section taken on the line 2—2 of FIG. 1.
Figure 3:
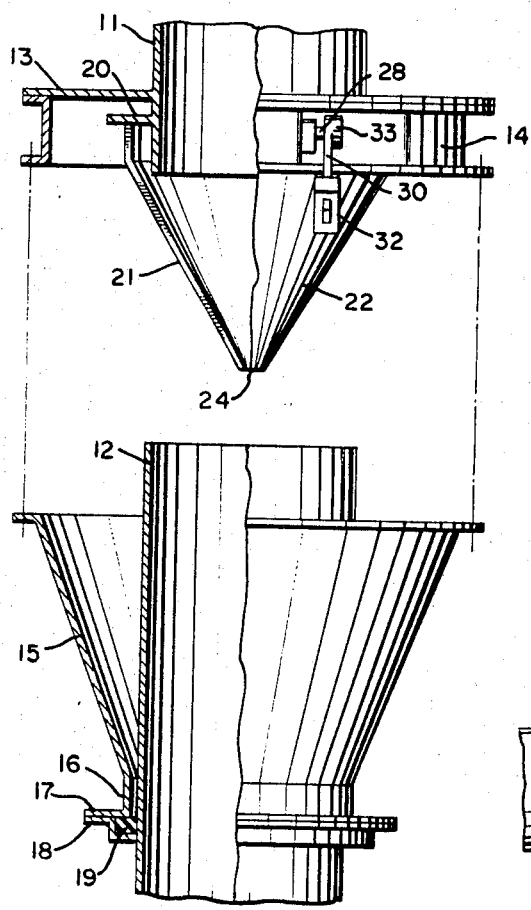
FIG. 3 is a section similar to FIG. 1, but taken in a vertical plane at 90° to that of FIG. 1 and along line 3—3 of FIG. 2.

As shown in FIGS. 1 to 3, a valve 10 intercepts the flow of cement raw meal from a pipe 11 to a pipe 12.

To the lower end of the pipe 11 is welded a horizontal annular plate 13 serving as a top cover for a housing which surrounds the interior part of the valve. To the plate 13 is bolted a substantially cylindrical section 14 which is provided with flanges at each end and together with the plate 13 constitutes the upper part of the housing, the central part of which is constituted by a conical section 15, and the lower end of which joins a cylindrical section 16 ending in a flange 17. Attached to the said flange is another flange 18 with a sealing ring 19 wedged between them. The sealing ring 19 serves the same purpose as the welding seam along which the pipe section 13 is attached to the pipe 11. Owing to the pipe 12 being surrounded tightly by the sealing ring 19, the combined parts 15, 16, 17, 18, and 19 may, after certain bolts or other means (not shown) for securing the pipe section 15 to the pipe section 14 are loosened, be lowered vertically as indicated in FIG. 3, the sealing ring 19 sliding on the pipe 12. This will uncover the interior movable parts of the valve easily for inspection or repairs, and the device may be reassembled with equal ease afterwards.

In addition to the annular plate 13 another annular plate 20 with smaller diameter than the former is welded to the pipe 11 at some distance below the plate 13. The plate 20 constitutes the base of a substantially hollow conical valve member which is divided into two identical parts 21 and 22 by means of an axial section. The adjacent edges of these parts are separated from each other by a slot 23 a few millimeters wide. The vertex of the cone has been cut off so as to leave an opening 24 which together with the slot 23 permits a certain passage of raw meal, even when the parts 21 and 22 are in the position indicated by solid lines in FIG. 1. Both of these measures contribute to ensure a uniform and shockless operation of the valve. Furthermore, owing to the slot, the parts 21 and 22 will in their closed position always lie in close contact with the plate 20 that acts as base for the conical valve member. It is to be noted that the conical valve member is mounted with its axis of symmetry extending in the direction of flow of the material and co-axially aligned with pipes 11 and 12.

To the parts 21 and 22 are attached arms 25 and 26 the free ends of which engage shafts 27 and 28 which are supported in the substantially cylindrical section 14. To allow for this, the section 14 is actually non-cylindrical at two diametrically opposite places as will be best seen from FIG. 2.

This supporting arrangement enables the two parts 21 and 22 to pivot about the shafts 27 and 28 so that they may swing away from the closed position indicated by solid lines in FIG. 1, assuming for example, the position indicated by dash-and-dotted lines instead. In this position, the slot 23 has now been substantially widened and the parts 21 and 22 have moved away from the annular base plate 20.

The parts 21 and 22 are urged towards the closed position by means of arms 29 and 30 attached to the shafts 27 and 28 and, fitted with counterweights 31 and 32 which produce such a turning moment about the shafts 27 and 28. However, the sections 21 and 22 may be spread apart by the weight of raw meal from the pipe 11.

The arm 29 is fastened to the shaft 27 by a pointed screw (not shown) passing through a sleeve 33 in which the arm 29 ends. The arm 30 has a corresponding equipment. The pointed screws permit the arms to be attached in different angular positions in relation to a horizontal plane through both shafts 27 and 28. The position elected in accordance with FIGS. 1 and 3 is an angular position by which an increase in the opening between the parts 21 and 22 causes the moment for closing the parts to increase to a suitable extent. The closing force may be further varied by displacement of the counterweight 31 and 32 on the arms 29 and 30.

Thus, the parts 21 and 22 remain closed until material of sufficient required weight as determined by the position of the arms and their respective counterweight has accumulated as a dam of material within the hollow valve member and at this point they will open and a steady stream of material will flow so long as material in excess of the required weight is maintained. Should material flow from pipe 11 cease, the sections 21 and 22 will close with sufficient accumulated material therein to effect a gas seal between pipe 11 and pipe 12.

Figure 4:
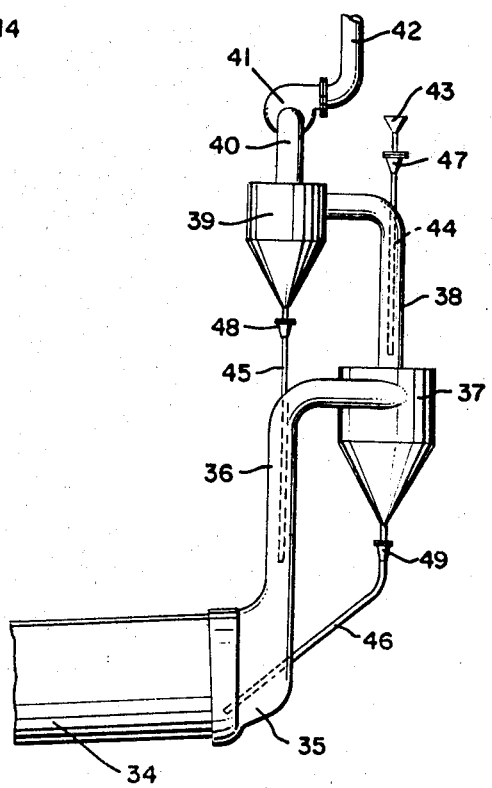
FIG. 4 is a diagrammatic view of the whole preheater.

As shown in FIG. 4, kiln gases pass from the upper end of a rotary kiln 34 through a connecting member 35 into a vertical riser pipe 36, the upper end of which opens tangentially into a cyclone 37. Another riser pipe 38 connected to the top of this cyclone opens tangentially into another cyclone 39. A top discharge pipe 40 leads from the cyclone 39 to the suction side of a fan 41 the delivery side of which opens into a pipe 42 leading gases directly either into the atmosphere or first through a dust filter (not shown).

By the operation of the fan 41, the exit gases from the rotary kiln 34 will be sucked along the path 35, 36, 37, 38, 39, and 40 and subsequently be expelled directly into the atmosphere or through the dust filter, where the gases may be relieved of any dust content which might otherwise contaminate the atmosphere.

The cyclone preheater serves, as will be known, to, preheat the raw meal later to be burnt to cement clinker in the rotary kiln 34. The raw meal is fed into a hopper 43 from which it flows through a discharge pipe 44 into the bottom of the riser pipe 38. Here the raw meal leaves the pipe 44 and is caught by the upward flow of gases in the riser pipe 38 which are consequently cooled, whereas the raw meal is heated. The kiln gases with their suspended raw meal are then introduced into the cyclone 39 in which the raw meal sediments while the kiln gases proceed through the pipe 40. The precipitated raw meal sinks through a discharge pipe 45 down to the lower end of the riser pipe 36, in which the raw meal is caught by the upward flow of kiln gases and receives heat from these after which the raw meal passes with the gases into the cyclone 37. Here a precipitation of the raw meal again takes place and the kiln gases ascend through the riser pipe 38, whereas the raw meal settles to the bottom and passes through a pipe 46 into the rotary kiln 34.

The preheater is a two-stage preheater. A one-stage preheater would be without the riser pipe 38 and the cyclone 39, whereas a three-stage or a four-stage preheater would have had one or two sets of riser pipes with corresponding cyclone in addition to those indicated in FIG. 4.

Valves according to FIGS. 1 to 3 are fitted in interruptions in the pipes 44, 45, and 46 at points 47, 48 and 49 respectively. The upper and lower parts of these pipes above and below the interruptions respectively correspond to the pipes 11 and 12 respectively of FIGS. 1 to 3. The raw meal dams up in the valves sufficiently to form a gas seal and the valve 47 prevents atmospheric air from being sucked through the feed hopper 43 and the feed pipe 44 into the cyclone system with consequent equalization of the sub-atmospheric pressure established in the system by the fan 41. Such equalizations may be detrimental to the kiln operation; in fact, any false air sucked into the kiln gas flow of a rotary kiln is, as is known, undesired. Since the said sub-atmospheric pressure increases the nearer one gets to the fan 41, there will be a greater sub-atmospheric pressure in the cyclone 39 than in the cyclone 37, just as the sub-atmospheric pressure inside the cyclone 37 will be greater than that inside the rotary kiln 34. The valves 48 and 49 therefore serve to prevent kiln gases from flowing from below through the discharge pipes 45 and 46 into the cyclones 39 and 37. Such an inflow of kiln gases would counteract a regular outflow of raw meal through the dischaarge pipes.

The valves 47, 48 and 49 thus permit a free downward passage of raw meal through the pipes 44, 45, and 46, but prevent the passage of kiln gases through these pipes, in the case of the pipe 44 in a downward direction and in the case of the pipes 45 and 46 in an upward direction. The amount of raw material flowing through the valve in a steady stream will be that amount by weight in excess of the dam material and this amount will vary with the position of counterweights 31 and 32 on arms 29 and 30.

I claim:

1. A valve for impeding and regulating flow of powdered and granular material through a duct comprising a hollow funnel-shaped valve member mounted in said duct having its wide inlet end facing upstream in the direction of flow of material and its narrow outlet end positioned downstream, said member divided into at least two sections which are pivotally mounted adjacent their inlet ends for movement from a closed position in which the outlet end is closed to an open position in which outlet end portions of said sections are substantially spaced apart, and means on each of said sections for urging the sections toward each other in its closed position with a dam of material maintained therein sufficient to effect a gas seal across the duct but permitting the sections to pivot to the open position under a weight of the material in excess of that required for the gas seal to allow a stream of material to pass through the valve while maintaining the gas seal wherein the valve member mounted in a housing having a upper portion connected to the bottom portion of an inlet duct and a lower portion detachably connected to said upper portion and mounted for telescopic movement on an upper portion of an outlet duct.

References Cited

UNITED STATES PATENTS

| 304,982 | 9/1884 | Wiesebrock | 302—59 |
| 689,756 | 12/1901 | Sebelle | 222—502 |
| 2,474,205 | 6/1949 | Welty | 302—59 |

ANDRES H. NIELSEN, *Primary Examiner.*

U.S. Cl. X.R.

302—59